United States Patent [19]
Kakuda et al.

[11] 3,753,743
[45] Aug. 21, 1973

[54] METHOD FOR PREPARING GLASS BATCH
[75] Inventors: Hisashi Kakuda; Shiro Takahashi; Junji Aki, all of Kitakyusyu, Japan
[73] Assignee: Asahi Glass Company, Ltd., Tokyo, Japan
[22] Filed: Dec. 17, 1971
[21] Appl. No.: 209,067

[30] Foreign Application Priority Data
Dec. 18, 1970 Japan............................. 45/113093

[52] U.S. Cl..................................... 106/52, 1.5/27
[51] Int. Cl............................. C03c 1/00, C03c 3/04
[58] Field of Search........................ 106/52, 53, 54; 65/18, 27

[56] References Cited
UNITED STATES PATENTS
| | | | |
|---|---|---|---|
| 3,503,790 | 3/1970 | Gringas | 106/DIG. 8 |
| 3,542,534 | 11/1970 | Yamamoto | 106/DIG. 8 |
| 2,976,161 | 3/1961 | Smith | 106/DIG. 8 |
| 3,573,887 | 4/1971 | Mod et al. | 106/52 |
| 3,630,673 | 12/1971 | Mod et al. | 106/DIG. 8 |
| 3,451,831 | 6/1969 | Miche | 106/DIG. 8 |
| 3,081,180 | 3/1963 | Krinov | 106/DIG. 8 |

*Primary Examiner*—Helen M. McCarthy
*Attorney*—Norman F. Oblon et al.

[57] ABSTRACT

In a method for preparing a glass batch using caustic soda solution as the main source of $Na_2O$ for the glass, silica and other solid glass raw materials are first admixed and then the caustic soda solution is fed to the mixture. Preheated glass cullet is added to the mixture during the mixing operation, so that the water from the caustic soda solution is evaporated to provide a glass batch which is easily melted and refined and also is easily handled.

Preferably, hot gas containing carbon dioxide is supplied during the mixing operation.

4 Claims, 5 Drawing Figures

METHOD FOR PREPARING GLASS BATCH

BACKGROUND OF THE INVENTION

1. Field Of The Invention

This invention relates to a method for preparing a glass batch using caustic soda solution as a source of sodium oxide ($Na_2O$) for glass.

2. Description of The Prior Art

Soda ash, or sodium carbonate, is conventionally used as the main source of sodium oxide in the preparation of a batch for manufacture of silicate glass, particularly soda-lime or soda-lime-magnesia silicate glass, which is produced largely on an industrial scale. Heretofore, a method has been proposed for preparing glass batch wherein caustic soda, or sodium hydroxide, is used in place of soda ash. For example, in U.S. Pat. No. 3,542,534, a process is described for briquetting or pelletizing wet glass batches obtained by mixing appropriate glass raw materials and then admixing with a caustic soda solution.

In U.S. Pat. No. 3,503,790, a process for preheating silica sand, then contacting the preheated silica sand with a caustic soda solution and admixing the resulting product with other glass raw material is disclosed.

Such pretreatment is carried out in these former methods because when caustic soda solution is simply admixed with other glass raw materials, the resulting batch may be in slurry form and is therefore difficult to handle. Moreover, where such high water content batches are directly charged into a glass melting furnace, the melting and refining characteristics of the batches are so adverse as to render such methods inoperable on an industrial scale. Accordingly, in any conventional method, the excess water must be removed to adjust the water content so as to be suitable for melting and handling.

However, in the conventional methods for briquetting or pelletizing the glass batch, a relatively large size apparatus is required, and additionally much time is required for drying, preheating or carbonating the resulting briquette or pellet. From the standpoint of the apparatus and time required, therefore, many industrial difficulties have been encountered with presently available methods. A large size apparatus also is required in the method for preparing the mixture by adding caustic soda solution to silica to place it in a wet condition. Moreover, caking and segregation of the powdery product of silica-caustic soda make this procedure not altogether satisfactory either.

SUMMARY OF THE INVENTION

The present invention contemplates the use of cullet as a heat transfer medium and a crushing agent in a method for preparing a glass batch using caustic soda solution, since the cullet, which is waste glass normally produced in large amounts in the forming and cutting processes performed in sheet glass or ware glass manufacturing factories, is usually returned to raw material as cycling cullet. As a result, a glass batch has been prepared having homogeneity and particle size distribution suitable for glass manufacturing and especially for sheet glass manufacturing.

Accordingly, it is a primary object of this invention to provide a method for preparing powdery form glass batch suitable for handling without need for any comprehensive and relatively large size apparatus.

This and other objects can be attained in accordance with at least one aspect of the present invention by a method for preparing glass batch using caustic soda which comprises the steps of preheating glass cullet and charging silica and other necessary solid glass raw materials in a mixer, then charging the caustic soda solution and further charging the preheated glass cullet while charging the caustic soda solution.

Preferably, a hot gas, especially a hot gas containing carbon dioxide is caused to contact the glass batch during the mixing operation.

The method for preparing glass batch according to this invention is suitable for the manufacture of soda-lime or soda-lime-magnesium silicate glass which is most commercially produced in the form of sheet or plate glass, or wareglass. This type of glass usually contains 10–20 percent by weight of sodium oxide and generally has the following compositions by weight:

| | |
|---|---|
| $SiO_2$ | 50–75% |
| $Al_2O_3$ | 0.1–10% |
| CaO | 5–15% |
| MgO | 0–8% |
| $Na_2O$ | 10–20% |
| $K_2O$ | 0–3% |

In addition to these components, if necessary, small amounts of sub-components such as BaO, PbO, $B_2O_3$ or $Li_2O$, coloring agents such as $Fe_2O_3$, CoO, Se, $Cr_2O_3$ or NiO, or refining agents such as $As_2O_3$ or F, may be included.

As the main source of $SiO_2$, silica sand is employed. Feldspar is used as the main source of $Al_2O_3$. As the source of CaO and/or MgO, limestone, or calcium carbonate, and/or dolomite or magnesium calcium carbonate, is mainly used. The source of $Na_2O$ conventionally is soda ash, and a part of the soda ash, usually about 3–15 percent of it, may be replaced with sodium sulfate, which is added for refining the glass.

These solid glass raw materials are combined in predetermined proportions according to the final glass composition to be manufactured. In this invention, almost all amounts of $Na_2O$ for the glass can be supplied from caustic soda solution, although it is preferable to replace only soda ash with a caustic soda solution. The rate of substitution of soda ash by caustic soda solution should be practically more than 30 percent and preferably from 50 to 100 percent. Another source of $Na_2O$, for example, sodium sulfate, may also be substituted with the caustic soda solution, if desired.

The concentration range of the caustic soda solution used in this invention is usually 30–75 percent by weight. If the concentration is lower than 30 percent, a large amount of water is introduced into the batch which is difficult to varpoize during the mixing operation. If the concentration is more than 75 percent, the likelihood of corrosion of the apparatus occurring is increased and the freezing point is much higher than the room temperature, making handling of the solution inconvenient. In these points, therefore, it is preferable to use caustic soda solution in a concentration of 45 to 55 percent by weight.

According to this invention, glass cullet charged into a mixer is preheated at about 300° – 600° C in order to vaporize the water introduced into the glass batch accompanied by the caustic soda solution. When the glass cullet is lower than about 300° C, the vaporization effect of the glass cullet is poor, and when higher than about 600° C, the particles of glass cullet tend to soften and fuse with each other. It is preferable therefore to preheat the glass cullet to approximately between 450° – 550° C.

The amount of glass cullet charged into the mixer is about 25 – 75 percent, preferably 30 – 60 percent, by weight of the total amount of the batch. If it is less than 25 percent, the crushing effect of the glass cullet decreases, and if it is more than 75 percent, the cost of batch preparation is increased remarkably and the carbonating reaction between the caustic soda and carbon dioxide gas is disturbed.

BRIEF DESCRIPTION OF THE DRAWING

Various other objects, features and attendant advantages of the present invention will be more fully appreciated as the same becomes better understood from the following detailed description when considered in connection with the accompanying drawings, in which like reference characters designate like or corresponding parts throughout the several figures, and wherein.

DESCRIPTION OF THE INVENTION

Figure 1:
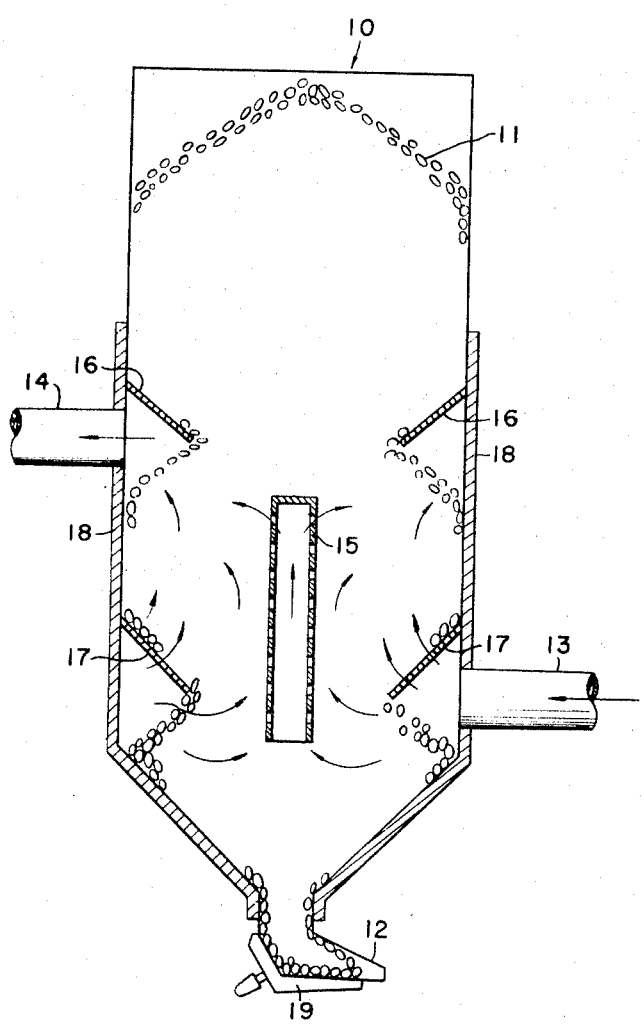
FIG. 1 is a sectional view of an apparatus for preheating glass cullets used in performing the method of this invention.

Referring now to the drawings, wherein one embodiment of the method for preparing a glass batch according to this invention is illustrated, FIG. 1 shows an apparatus for preheating glass cullet. The apparatus can be made by changing the conventional tank of cycling cullet which is employed in most glass manufacturing factories. The glass cullet 11 is charged in a tank 10 through an inlet in the top of the tank and is discharged from an outlet 12 at the bottom. A gas, such as flue gas, waste gas, or other hot gas, obtained from another heat source, which is usually at a temperature of about 400° – 550° C is supplied through an inlet port 13 in the lower part of the tank under pressure, being passed through the cullet layer in the tank and exhausted from an outlet 14 to the outside, or it may be supplied to a flue of the melting furnace. A central pipe 15 having a plurality of holes on the side wall is disposed in the middle of the tank. The pipe 15 is to prevent deviation of the path of the hot gas in the tank so as to cause the hot gas to rise along the center of the tank, while the cullet is falling down along the center of the tank without deviation. At the upper part of the tank, a substantially annular cullet guide plate 16 slanting downwardly at about 45° is provided, and around the inlet 13 of hot gas at the bottom of the tank, a substantially annular porous plate 17 of similar configuration having a plurality of holes is provided, so as to control the condition of the falling glass cullet and the circulation of the hot gas.

Accordingly, the hot gas is countercurrently passed relative to the glass cullet in the tank, whereby the glass cullet is uniformly heated.

An insulating material 18 for preventing thermal discharge is disposed on the outer surface of the tank 10. A vibrating feeder 19 is secured to the outlet 12 of the glass cullet, and the discharge passage therefrom is relatively small, accordingly being effective for maintaining the temperature of the glass cullet between the level of the hot gas inlet 13 and the outlet 12 of the glass cullet, although the hot gas may leak a little from the discharge passage.

One example of application of the tank of cullet described above follows.

Glass cullet of the usual sheet glass was first crushed by a roll crusher to less than about 5 cm. of length and was then cycled in a tank having a volume of 50 tons. When the amount of cycle of cullet was 90 tons/day and the waste gas from the glass melting furnace for heating the cullet was about 530° C, about 3,500 Nm$^3$/hour of the waste gas was required to provide the cullet being heated to about 500° C. The pressure loss of the waste gas was about 130 mm Aq. The amount of waste gas used is about one-eighth of the total waste gas from the melting furnace for manufacture of usual sheet glass. Accordingly, the waste gas from the melting furnace can be effectively used as a heat source for preheating the glass cullet.

The top of the tank of cullet 10 can be opened as with the conventional tank of cullet. The pressure resistance at the upper part of the heating layer of cullet, or from about the outlet 14 of hot gas to the top of cullet, is far higher than the pressure resistance between the heating layers, so that most of the hot gas is passed through the outlet 14. If necessary, it is possible to provide a suction fan in the duct of the outlet 14.

Figure 2:
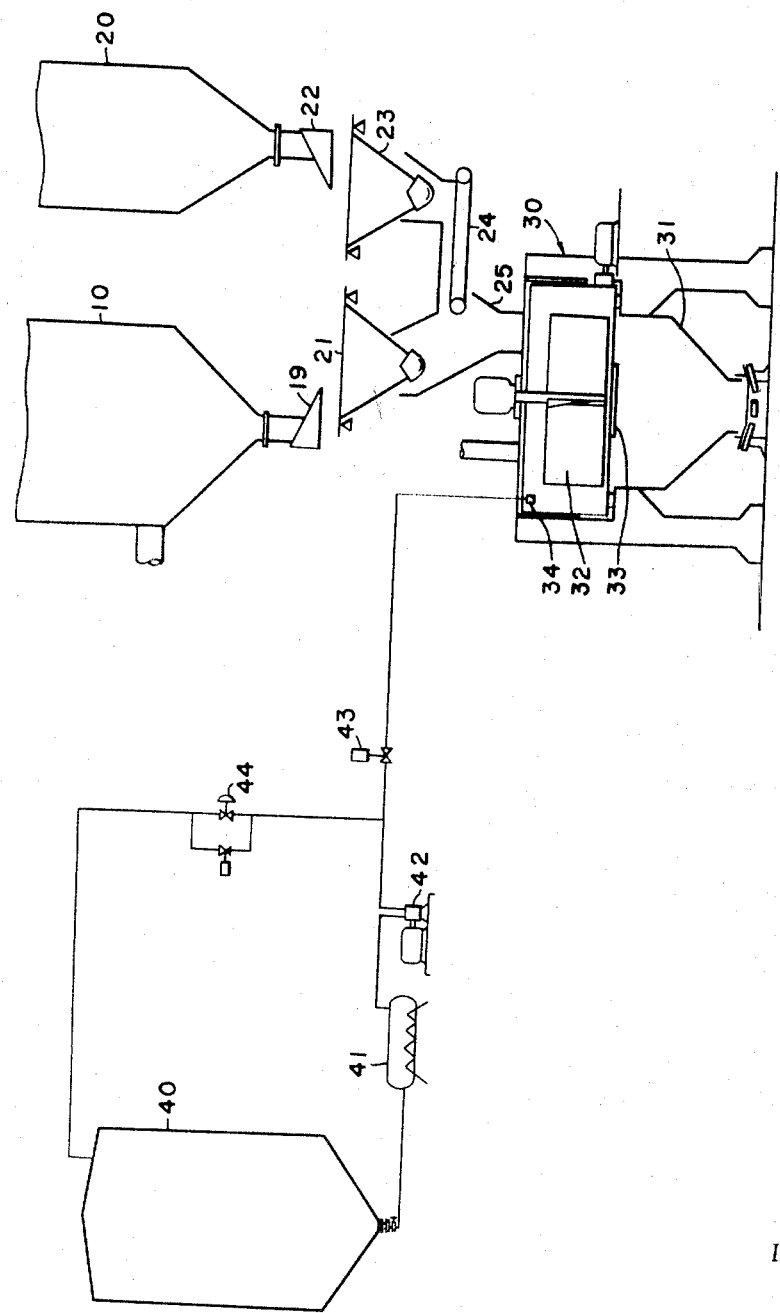
FIG. 2 is a schematic view of a commerical installation for carrying out one embodiment of the method of this invention.

FIG. 2 shows a detail of a process for preparing glass by uniformly admixing solid glass raw materials, caustic soda solution and preheated glass cullet and charging the mixture into a melting furnace.

The reference numeral 10 indicates the tank of cullet for preheating the glass cullet, as shown in FIG. 1. The preheated glass cullet is weighed by a weighing scale 21 after being discharged from the outlet 12 at the bottom of the tank 10, so that a specific amount of the preheated cullet is charged through a chute 25 of a mixer 30. On the other hand, the solid glass raw materials other than the caustic soda solution, such as silica sand, lime stone, dolomite, feldspar, Glauber's salt and other glass components, and soda ash, if such is used, are admixed at a predetermined ratio and stored in a tank 20. The solid glass raw materials are charged from an outlet 22 at the bottom of the tank 20 through a weighing scale 23, onto a belt conveyor 24 and thence to the chute 25.

A specific amount of caustic soda solution is sprayed from tank 40 through a nozzle 34 of the mixer 30 by a fixed quantity pump after being heated to a predetermined temperature by a temperature regulator 41. The reference numeral 43 indicates an electro magnetic valve in the line leading from the tank 40 to the mixer, and 44 indicates a relief valve. The mixer 30 also is provided with a stirrer 32.

The mixed glass batch is discharged from an outlet 33 of the mixer 30 and is transferred through a chute 31 and generally onto a belt conveyor for transfer to an inlet of the glass melting furnace. The order schedule of the mixing steps is as follows:

1. Initiation of operation of the mixer;

2. Initiation of charging of the solid glass raw materials into the mixer at the same time or after a small delay of initiation of operation of the mixer;
3. Initiation of the supply of caustic soda solution after beginning the charge of the solid glass raw materials;
4. Initiation of charging of glass cullet following charging of the solid glass raw materials;
5. Stopping the supply of the caustic soda solution after finishing the charging of the glass cullet; and
6. Stopping the operation of the mixer.

The time schedule of these mixing steps may be schematically illustrated as shown in the following table:

TABLE I

| step | time of duration |
|---|---|
| operation of mixer | ←——————————————→ |
| charging solid glass raw materials | ←————→ |
| charging glass cullet | ←————→ |
| supply of caustic soda solution | ←——————————→ |

In these operations, the content of water in the mixture of raw materials is gradually increased depending upon the addition of caustic soda solution. When the preheated glass cullet is charged into the mixture, severe water evaporation is caused by the heat of the cullet. As violent dusting may be caused by directly mixing the preheated cullet with the glass raw material, it is preferable to charge the preheated cullet after initiating the supply of caustic soda solution to the glass raw materials for wetting them. According to the time schedule of the various charges, the formation of a slurry formation of the raw materials by adding caustic soda solution is prevented by the evaporation of water caused by the heat of the cullet being charged.

Moreover, the glass cullet operates as a suitable grinding agent to provide a glass batch having suitable particle size distribution and homogeneity, as shown in the following examples.

The glass batch obtained by these operations is thus transferred to a tank of raw materials in advance of being charged into the melting furnace, and then is charged to the melting furnace as final glass raw materials.

The following are illustrative examples of the method of preparing the glass batch in accordance with the prescribed steps of the invention:

EXAMPLE I

| Standard batch composition | Kg. |
|---|---|
| Silica sand | 750 |
| Feldspar | 52 |
| Sodium sulfate | 38 |
| Limestone | 230 |
| Soda Ash | 220 |
| Coke | 0.7 |
| Cullet | 710 |

In this preparation of glass batch, 50 percent of the soda ash of the standard batch composition for use as sheet glass, was replaced with 48 percent caustic soda solution.

Thus, 110 Kg. of soda ash and the other solid raw materials, except the cullet, were first mixed and then were charged into a mixer having a 2 ton capacity. Then 172 Kg. of 48 percent caustic soda solution was supplied to the mixer. After charging the solid glass raw materials, 710 Kg. of the glass cullet preheated to about 500° C by waste gas was charged in the mixer and mixed for about 3 minutes. The temperature of the resulting glass batch containing cullet was about 120° C. The water content of the batch including the water of crystallization of sodium sulfate and soda ash, was about 5 percent. The batch is usually charged to the melting furnace after storage on the batch charger for a given time period. However, the batch was not wetted by absorption of moisture, because it was heated to about 120° C.

According to our experiments, the batch is gradually moistened at less than 95°C. Accordingly, the moistening of the batch can be prevented, in practical use, by slightly heating around the hopper of the batch charger of the melting furnace. In this example, 50 percent of soda ash was substituted with 48 percent caustic soda solution. In order to increase the rate of substitution, a higher concentration of caustic soda solution may be employed. For example, the rate of substitution of soda ash to caustic soda can be increased to 80 percent by using about 65 percent caustic soda solution to provide substantially the same glass batch.

In this operation, the glass raw materials tend to be caked by adding the caustic soda solution, as usual, but the caking can be prevented by the cullet to provide a glass batch having uniform fine particle size distribution. However, it is disadvantageous to use a higher concentration of caustic soda solution, because the chance of corroding the apparatus with the solution is increased and the freezing point is higher than room temperature, thereby rendering treatment and storage or transportation difficult as well as inconvenient. Accordingly, in industrial operations, it is preferable to use lower than 55 percent caustic soda solution.

Figure 3:
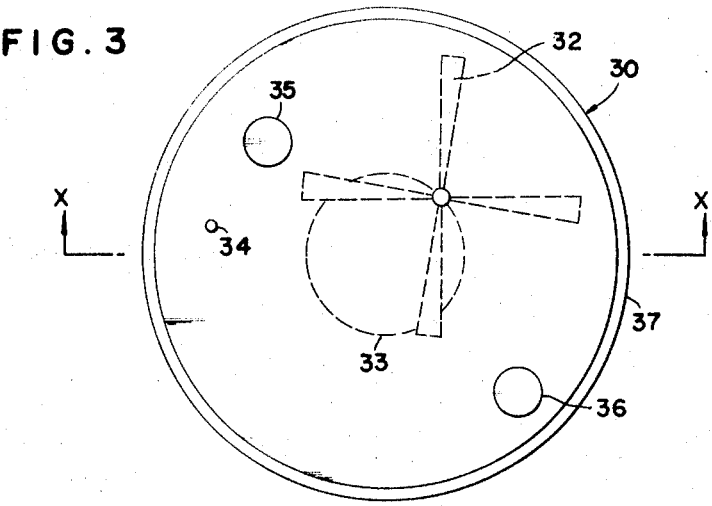
FIG. 3 is a plan view of a mixer used for carrying out another embodiment of the method of this invention.
Figure 4:
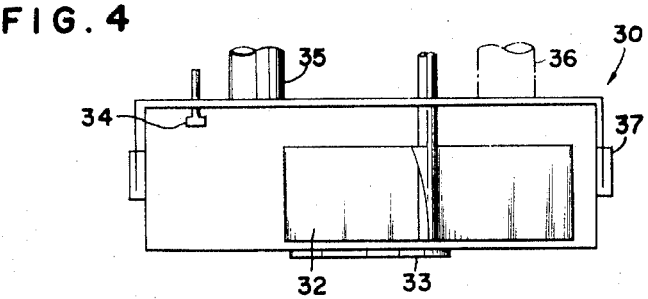
FIG. 4 is a sectional view taken along the line X — X in FIG. 3.

Tests conducted under the steps of the present invention succeeded in substituting 100 percent of the soda ash with a caustic soda solution by charging hot gas, such as waste gas containing carbon dioxide gas, in the mixer, even though about 50 percent caustic soda solution is used as the more preferable embodiment of this invention, which will be illustrated now referring to FIGS. 3 and 4.

FIG. 3 shows a plan view of a mixer for mixing solid glass raw materials, caustic soda solution, and preheated glass cullet wherein hot gas, such as waste gas from the melting furnace or another heat source, is supplied.

FIG. 4 is a sectional view taken along the line X—X of FIG. 3. In FIGS. 3 and 4 it may be seen that the mixer 30 is provided with a stirrer 32 for mixing the batch and preventing caking, and the mixed glass batch is discharged from an outlet 33 in the bottom. Caustic soda solution is supplied through a spray nozzle 34. The reference numeral 35 indicates an inlet of hot gas and 36 indicates an outlet of hot gas. A water seal 37 is provided for preventing leakage of the hot gas.

The solid glass raw materials, caustic soda solution and pre-heated glass cullet are mixed while being contacted with hot gas.

Where the amount of caustic soda solution is limited as in the case of charging about 48 percent caustic soda solution and preheated glass cullet in accordance with the process referring to FIG. 2, the raw materials in the mixer provide suitably fine particles. The fine particles of raw materials are in a semi-floating condition without causing dusting in the mixer. Where hot gas is supplied in this condition, the contacting area between the hot gas and the particles of the raw materials is remarkably large so that rapidly and remarkably effective vaporization of the water contained therein is effected.

The time schedule in the operation employing a mixer as shown in FIG. 3, is shown in the Table 3.

TABLE 3

| step | time of duration |
|---|---|
| operation of mixer | ⟵─────────────────⟶ |
| charging solid glass raw material | ⟵──────⟶ |
| charging glass cullet | ⟵──────⟶ |
| supply of caustic soda solution | ⟵──────────⟶ |
| supply of hot gas | ⟵──────────────⟶ |

The hot gas is supplied at the initiation of supply of the caustic soda solution, and the supply is stopped at about the finish of the operation of the mixer. In accordance with the operation controlled by this time schedule, a glass batch having uniform particle size distribution can be obtained.

EXAMPLE 2

In this preparation of glass batch, all of the soda ash of the standard batch composition as set forth in Example 1 was substituted with 48 percent caustic soda solution. Thus, 344 kg. of 48 percent caustic soda solution instead of 220 kg. of soda ash was supplied to the mixer having a 2 ton capacity, shown in FIGS. 3 and 4, after initiation of the step of charging the solid glass raw materials which were premixed. After finishing the charge of these solid glass raw materials, 710 kg. of glass cullet being preheated to about 500° C. by waste gas was charged into the mixer and was mixed for about 7 minutes. On the other hand, the waste gas containing about 9 percent carbon dioxide and about 0.1 percent sulfur dioxide at about 530° C., which was obtained from the melting furnace, was supplied, as hot gas, to the mixer during the operation after starting charging the solid raw materials.

The amount of waste gas supplied was aboit 800 Nm³ per each 2 tons of glass batch, and the ventilation resistance was about 60 mm. Ag. The resulting glass batch was at 120° C. and contained 5 percent of water and had similar appearance, particle size distribution and uniformity of components to those of the glass batch resulting from the tests illustrated in Example 1.

It was found that about 65 percent of caustic soda added in the batch was carbonated. The particle size distribution of the resulting glass batch will be shown in comparison with conventional glass batch described with reference to Example 1.

| particle size | | % by weight (Distribution) | |
|---|---|---|---|
| $\mu$ | mesh | Batch of Example 2 | Conventional batch |
| +1000 | +16 | 3.5 | 3.3 |
| 1000–710 | 16–24 | 28.0 | 16.2 |
| 710–500 | 24–32 | 19.0 | 13.4 |
| 500–297 | 32–48 | 22.0 | 18.4 |
| 297–210 | 48–70 | 11.5 | 11.6 |
| 210–177 | 70–80 | 4.5 | 6.2 |
| 177–105 | 80–150 | 6.0 | 12.7 |
| −105 | −150 | 5.5 | 18.2 |

Thus, in the batch prepared in accordance with this invention, the amount of fine particles causing dusting was decreased and the particle size distribution was more uniform.

Figure 5:
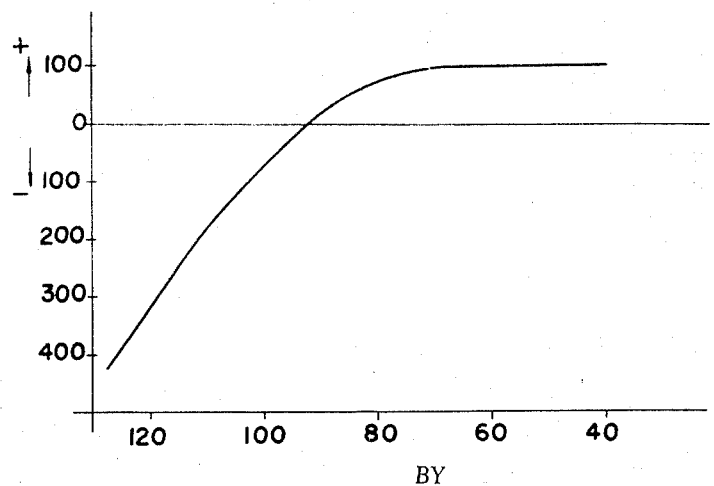
FIG. 5 is a graph for showing moisture absorbing characteristics of the glass batch obtained by the method of this invention.

FIG. 5 shows a graph comparing the moisture absorbing rate of the batch to the temperature of the batch of Example 2, wherein the moisture absorbing rate indicates the increase or decrease of grams of water per each hour per 1 m² of surface area of the batch. In the measurement, 700 g. of the batch, excluding the glass cullet, was fed into a container having a diameter of 125 mm and the velocity of change of weight of the batch caused by absorption or evaporation of water at each temperature was measured by a balance scale.

The observed velocity of change of weight, or the moisture absorbing rate, was calculated in the value per 1 m² of surface area of the batch, and is shown in FIG. 5, wherein it is evident that water of the batch was evaporated at temperatures higher than about 90° C., since the moisture absorbing rate then becomes negative.

In this example, a part of the caustic soda in the glass batch was sulfated besides being carbonated, since the hot gas contains sulfur dioxide gas together with carbon dioxide gas. Where it is preferable to avoid the formation of carbonate and sulfate, a hot gas or air containing no $CO_2$ or $SO_2$ can be used which may be provided by heat exchange with the waste gas.

In the glass batch resulting from this operation, such as shown in Example 2, about 65 percent of the caustic soda was carbonated. The heat used for melting can be decreased since heat is provided by the rapid reaction of the remaining 35 percent of caustic soda with silica sand. Moreover, the latent heat of the glass batch increases the velocity of the melting of the batch. The batch has a uniform particle size distribution so that no dusting is caused in the charging steps. In the transportation of the batch to charge the same into the melting furnace, little segregation occurs, so that the batch loss is small and corrosion of the refractories of the melting furnace is decreased.

Even though the water content of the batch is decreased to 2–3 percent for increasing the melting coefficiency, this advantageously causes no dusting because of the presence of caustic soda.

EXAMPLE 3

| | Kg. |
|---|---|
| Silica sand | 750 |
| Feldspar | 34 |
| Sodium Sulfate | 30 |
| Dolomite | 212 |
| Soda ash | 228 |
| Coke | 0.5 |
| Cullet | 700 |

The batch composition of Example 3 which is for use as another type of sheet glass, includes dolomite as a source of MgO and CaO, instead of limestone. In the preparation of the glass batch, all of the soda ash was substituted with 48 percent caustic soda solution, namely 356 Kg of 48 percent caustic soda solution being supplied to the mixer having a 2 ton capacity after the initiation of charging the premixed solid glass raw materials.

The subsequent steps were carried out in the same manner as mentioned in Example 2. The resulting glass batch was at 120° C and contained 5 percent of water and about 65 percent of the caustic soda being added in the batch was carbonated. It has almost the same appearance, particle size distribution and uniformity as those of the glass batch produced in Example 2.

Obviously many modifications and variations of the present invention are possible in light of the above teachings. It is to be understood therefore that within the scope of the appended claims, the invention may be practiced otherwise than as specifically described herein. ACCORDINGLY,

What is claimed is:

1. In a method for preparing glass batch having uniform fine particle size distribution to be used for manufacturing soda lime silicate glass wherein caustic soda aqueous solution is used as the main source of sodium oxide in the glass, the improvement which comprises the steps of:

first charging silica and other solid glass raw materials into a mixer;

during and following said charging, supplying caustic soda solution in 30-75 percent concentration by weight into said mixer; and following said charge introducing glass cullet, crushed to less than about 5 centimeters length and preheated to a temperature of 300° – 600° C, into said mixer wherein the quantity of said glass cullet is greater than 25 percent of the total amount of the batch; and stopping the supply of caustic soda after finishing the charging of glass cullet and continuing operation of the mixer to evaporate most of the water of the caustic soda solution.

2. A method according to claim 1, wherein the solid glass raw materials comprise silica sand and limestone or dolomite as the main components thereof and are first charged into the mixer, the supply of caustic soda solution and a hot gas are initiated while charging the raw materials, and the preheated glass cullet is charged while supplying the caustic soda solution and the hot gas.

3. A method according to claim 2, wherein the hot gas contains carbon dioxide gas to form carbonate.

4. A method according to claim 1, wherein the solid glass raw materials being used comprise:

silica sand
feldspar
sodium sulfate
limestone or dolomite
soda ash balanced to caustic soda an amount of the glass cullet is 25 – 75 percent by weight, based on the total batch.

* * * * *